United States Patent
Kelkar et al.

(10) Patent No.: US 12,282,743 B2
(45) Date of Patent: Apr. 22, 2025

(54) AUTONOMOUS CONVERSATIONAL AI SYSTEM WITHOUT ANY CONFIGURATION BY A HUMAN

(71) Applicant: GICRM AI LLC, Palo Alto, CA (US)

(72) Inventors: Amol Kelkar, Redmond, CA (US); Nikhil Varghese, San Francisco, CA (US); Chandra Khatri, San Francisco, CA (US); Utkarsh Mittal, Foster City, CA (US); Nachiketa Rajpurohit, San Mateo, CA (US); Peter Relan, Atherton, CA (US); Hung Tran, Foster City, CA (US)

(73) Assignee: GICRM AI LLC, Palo Alto, CA (US)

(*) Notice: Subject to any disclaimer, the term of this patent is extended or adjusted under 35 U.S.C. 154(b) by 0 days.

(21) Appl. No.: 17/570,281

(22) Filed: Jan. 6, 2022

(65) Prior Publication Data
US 2023/0274095 A1  Aug. 31, 2023

Related U.S. Application Data

(60) Provisional application No. 63/135,840, filed on Jan. 11, 2021.

(51) Int. Cl.
G06F 17/00  (2019.01)
G06F 40/247  (2020.01)
(Continued)

(52) U.S. Cl.
CPC ............ *G06F 40/49* (2020.01); *G06F 40/247* (2020.01); *G06F 40/289* (2020.01); *H04M 3/527* (2013.01)

(58) Field of Classification Search
CPC ........ G06N 5/022; G06N 20/00; G06N 3/044; G06N 3/047; G06N 3/091; G06F 40/35;
(Continued)

(56) References Cited

U.S. PATENT DOCUMENTS

| 11,392,773 B1* | 7/2022 | Gangadharaiah ..... G06F 40/242 |
| 2013/0275164 A1* | 10/2013 | Gruber ................... G06Q 10/02 705/5 |

(Continued)

FOREIGN PATENT DOCUMENTS

WO  WO-2019150222 A1 *  8/2019  ........... G06F 40/216

*Primary Examiner* — Michael Ortiz-Sanchez
(74) *Attorney, Agent, or Firm* — Schwegman Lundberg & Woessner, P.A.

(57) ABSTRACT

Described herein is an Autonomous Conversational AI system, which does not require any human configuration or annotation, and is used to have multi-turn dialogs with a user. A typical Conversational AI system consists of three main models: Natural Language Understanding (NLU), Dialog Manager (DM) and Natural Language Generation (NLG), which requires human provided data and configuration. The system proposed herein leverages novel Conversational AI methods which automatically generates conversational AI configuration from any historical conversation logs. The automatically generated configuration contains Auto-Topics, Auto-Subtopics, Auto-Intents, Auto-Responses and Auto-Flows which are used to automatically train NLU, DM and NLG models. Once these models are trained for given conversation logs, the system can be used to have dialog with any user.

22 Claims, 8 Drawing Sheets

(51) Int. Cl.
*G06F 40/289* (2020.01)
*G06F 40/49* (2020.01)
*H04M 3/527* (2006.01)

(58) Field of Classification Search
CPC .......... G06F 40/40; G06F 40/49; G06F 40/20; G06F 40/247; G06F 40/279; G06F 40/289; G06F 40/263; G06F 40/47; G06F 40/42; G06F 40/58; G06F 16/95; G06F 40/56; G06F 16/3329; G06F 16/3344; G06F 40/284; G06F 16/353; G06F 16/90332; G06F 18/214; G06F 16/685; G06F 18/24; G06F 16/3346; G06F 16/36; G06F 18/29; G06F 9/453; G06F 16/334; G06F 16/338; G06F 16/9024; G06F 3/167; G06F 16/355; G06F 16/33; G06F 18/241; G06F 16/243; G06F 16/3331; G06F 16/90335; G06F 18/20; G10L 15/1815; G10L 15/1822; G10L 2015/225; G10L 2015/228; G06Q 30/01; G06Q 30/015; H04M 3/527
See application file for complete search history.

(56) References Cited

U.S. PATENT DOCUMENTS

| | | | |
|---|---|---|---|
| 2017/0372694 A1* | 12/2017 | Ushio | G10L 21/0272 |
| 2018/0046923 A1* | 2/2018 | Jerram | G06Q 30/0256 |
| 2019/0182382 A1* | 6/2019 | Mazza | H04M 3/527 |
| 2020/0143247 A1* | 5/2020 | Jonnalagadda | G06N 3/044 |
| 2020/0219494 A1* | 7/2020 | Dhoolia | G10L 15/16 |
| 2021/0120206 A1* | 4/2021 | Liu | G06F 16/3329 |
| 2021/0256417 A1* | 8/2021 | Kneller | G10L 15/1815 |
| 2022/0045975 A1* | 2/2022 | Flöther | G06F 40/253 |
| 2022/0092269 A1* | 3/2022 | Le | G06N 3/044 |

* cited by examiner

FIG. 5

| User | Please cancel my account |
|---|---|
| Human Agent | Hi. Welcome to Excelchat. I am here to assist you. Can you share your email? |
| User | My email is sofie@xyz.com |
| Human Agent | Hi Sofie, I'm really sorry to hear that you want to cancel your subscription. May I know the reason you no longer want to use our services? |
| User | I'm not using it any more |
| Human Agent | I understand that you want to cancel your subscription but you have been a valuable customer. Therefore, I would like to offer you a very economical plan at $ 10 / 3 sessions / month. Would you be interested in this plan? |
| User | no |
| Human Agent | I am really sorry that our offer doesn't sound good enough. I have cancelled your subscription (with much regret!) and confirm that you will not be charged anymore. The portal will remain active until the end of the billing cycle in case you still need help. Thank you for using our service. |
| User | Awesome, thanks! |
| Human Agent | Have a great day, Sofie! |

*FIG. 6*

| Turn | Sentence | Actor | Message | Turn-level Auto-Intent Annotation | Turn-level Auto-Response Annotation | Sentence-level Auto-Intent annotation |
|---|---|---|---|---|---|---|
| 0 | 0 | user | I want to cancel my plan | cancel subscription | | cancel subscription |
| 1 | 0 | agent | Welcome | N/A | welcome message | N/A |
| 2 | 0 | agent | May I know the reason? | N/A | ask cancel reason | N/A |
| 3 | 0 | user | Yes. | cancel reason | N/A | affirm |
| 3 | 1 | user | I just dont need it anymore | cancel reason | N/A | cancel reason |
| 4 | 0 | agent | How about a very economic plan at $9.99 for 2 sessions/month? | N/A | offer plan | N/A |
| 5 | 0 | user | No i just want to cancel it | cancel subscription | N/A | cancel subscription |
| 6 | 0 | agent | I am really sorry that our offer doesn't sound good enough. I have canceled your subscription (with much regret!) and will send you an email to reconfirm. Thank you for using our service. | N/A | cancellation confirmation | N/A |
| 7 | 0 | agent | Is there anything else you need help with? | N/A | closing question | N/A |

FIG. 7

| Actor | Turn | Message | Model | Annotation Type | Annotation |
|---|---|---|---|---|---|
| user | 0 | Please cancel my account | NLU | sentence-level auto-intent | cancel subscription |
| agent | 1 | N/A | DM | turn-level auto-response | welcome message template |
| agent | 1 | Hi. Welcome to Excelchat. I am here to assist you. Can you share your email? | NLG | generated response | Hi. Welcome to Excelchat. I am here to assist you. Can you share your email? |
| user | 2 | My email is sofie@xyz.com | NLU | sentence-level auto-intent | provide email |
| agent | 3 | N/A | DM | action | sql_load_account_information |
| agent | 3 | N/A | DM | turn-level auto-response | ask cancel reason template |
| agent | 3 | Hi Sofie, may I know the reason? | NLG | generated response | Hi Sofie, may I know the reason you no longer want to use our services? |
| user | 4 | I'm not using it any more | NLU | sentence-level auto-intent | cancel reason |
| agent | 5 | N/A | DM | action | webhook_action_get_offers |
| agent | 5 | N/A | DM | turn-level auto-response | offer discount template |

FIG. 8

| Actor | Turn | Message | Model | Prediction Type | Prediction |
|---|---|---|---|---|---|
| agent | 3 | Hi John, may I know the reason? | NLG | generated response | Hi John, may I know the reason |
| user | 4 | It is too expensive | NLU | sentence-level auto-intent | cancel reason |
| agent | 5 | N/A | DM | action | webhook_action_get_offers |
| agent | 5 | N/A | DM | turn-level auto-response | offer discount template |
| agent | 5 | How about $10 / 3 sessions / month? | NLG | generated response | How about $10 / 3 sessions / month? |
| user | 6 | Yes please | NLU | sentence-level auto-intent | affirm |
| agent | 7 | N/A | DM | action | webhook_offer_accepted |
| agent | 7 | N/A | DM | turn-level auto-response | offer accepted confirmation template |

AUTONOMOUS CONVERSATIONAL AI SYSTEM WITHOUT ANY CONFIGURATION BY A HUMAN

CROSS-REFERENCE TO RELATED APPLICATIONS

This application claims the benefit of and is related to the U.S. Provisional Patent No. 63/135,840 filed on Jan. 11, 2021, the content of which is incorporated herein by reference.

FIELD OF THE INVENTION

The present invention relates generally to the field of Conversational A systems that handle user questions or conversations with an entity, which in one embodiment is a business, using deep neural networks based AI models to learn to converse with users in a very similar fashion that a human would. In one embodiment the human could be a call center agent or simply, an agent, and the user could be a customer of a business.

The present invention allows an entity to create an autonomous Conversational AI system (ACAi) by letting a software system inspect past conversations available in email exchanges or chatbots or voice call logs. The entity provides historical conversations and the system and method of the invention trains an AI system that can mimic, in one embodiment, the way human agents in the business have interacted with users in the past, thus creating an ACAI system through this system and method. This process requires no human involvement to configure the ACAI system by the entity user. Finally, the ACAI system is also capable of improving its own accuracy over time by automatically updating its configuration once it is in use.

BACKGROUND

Natural Language Processing or NLP using Deep Neural Networks (DNNs) has become an active field of research and commercial work in recent years. DNNs in Natural Language Processing are AI models that are capable of probabilistic pattern matching to see if a natural language utterance resembles a previously seen utterance they have been exposed to during a training phase, either exactly or similarly phrased, and produce an output or prediction of what to do or how to respond, based on this input utterance pattern match. Many types of applications of NLP models are being developed: including sentiment analysis of social media posts (negative, positive, neutral), summarization of large bodies of text, extraction of named entities from text (getting names and addresses out of a written mortgage contract) etc.

Human agents have been servicing users and customers of a business or an organization for a long time. Whether in sales, where a sales agent can help a customer select a product they want to buy from a business, or in customer service where a service agent can help a customer address an issue like refunding their payment if they are not happy with a purchase.

Even inside a business, a user may use a service offered by the business to its employees, such as an IR department acting as the entity, in which human resources agents can service a request the user, an employee, may have: such as how much vacation balance they have left.

With artificial intelligence or AI and NLP, it is now possible to offload some of the requests users may have of human agents to artificial intelligence based Conversational AI systems. This field is generally known as Conversational AI, and the problem is creating a Conversational AI system that can "converse" with a user or employee and address their sales, service or other questions and requests while making the user feel like they are talking to a human being.

Conversational AI (CAI) systems typically consist of three major components: Natural Language Understanding (NLL), Dialog Manager (DM) and Natural Language Generation (NLG). There is also an important piece of technology tied to the DM, which is called a Fulfillment or an Action Server. FIG. 3 showcases one embodiment of the proposed system containing these components.

NLU or Natural Language Understanding, involves understanding what the user is communicating, and NLG or Natural Language Generation which involves creating an utterance that would likely be what a human would say, transmitting it back to the user. Dialog Manager is the component that keeps track of the overall progress of the conversation, since it can involve multiple back and forth turns, history of what the user has said and the NLU has understood, and what the NLG has responded with, and uses the history and state of the conversation as context for enabling the Conversational AI system to taking certain actions if needed, such as retrieving information from a database or an API. For example purposes only, the user may utter: "My account number is 123456." and "What is my balance?" and the NLU would understand these first two user turns and their intents, the Dialog Manager would use the account number to request an action be fired off to retrieve account details from a database, using the account number 123456, and store the results in context variables. The NLG would respond "Let me pull up your account details". And finally the NLG would state: "Your account balance is $250.00".

To further understand each component, let's start with the NLU. The NLU component deals with understanding the messages sent by the user. One approach is to identify intents and slots in the user's message. An intent refers to a particular user intention that may be conveyed by a variety of different utterances. For instance, a cancel subscription intent may be indicated by utterances like "I want to cancel", "Please cancel my account", "I don't want my subscription anymore". A slot or entity is a value extracted from a user utterance. These entities could have values such as person names, organizations, locations, medical codes, time expressions, quantities, monetary values, percentages, etc. For instance, a user utterance "I want a refund of $10 by 6 pm" has two entities: monetary value of $10 and a time expression of 6 pm. Intent detection and entity extraction are standard tasks in NLP literature, typically performed using DNNs.

Once the NLU pipeline identifies user intent and any entities from a user utterance, the DM identifies any system actions that should be executed by an Action Server, and a response that will be sent to the user, along with. In some cases, the DM predicts a response template from a set of predefined response templates. The template may be of the form "You will be refunded $number by $date-time". The NLG module uses the predicted template and other contextual information, such as the amount and the day and time to construct the final response message. In other cases, the NLG module generates a text message using contextual information including but not limited to the intent and slot values detected by the NLU module and dialog state.

Recently, Conversational AI systems have been implemented to handle many use cases. In the field of voice and telephony, as one example, systems have been built where the user can say a phrase into the phone, and the system recognizes the phrase and responds appropriately. In the field of chatbots, as another example, a user may go to a website or a smartphone and chat through a chatbot going back and forth with the Conversational AI system on the other side of the chatbot.

The user experience offered by such systems is only as good as the sophistication of the technology in the Conversational AI system and, very importantly, the configuration information used to configure the system for a particular use case in an entity. Existing Conversational AI systems require substantial initial and ongoing human effort towards identifying and compiling the configuration information. Many tasks are involved in this effort. For example, a human needs to identify the conversation topics that the Conversational AI system should handle, collect examples of such conversations, identify various intents that the user may utter and specify various ways that intent may be uttered, and so on. These are complex tasks that require specialized human skills. As the Conversational AI system goes into live operation, deficiencies in coverage of user request types, and understanding need to be identified and incorporated into the configuration and the Conversational AI system needs to be re-configured constantly. These configuration changes are done manually with the help of some partial automation tools. Prior art exists for partially generating and suggesting topic, intent and slot values, though not for automatically generating configuration for the complete Conversational AI system.

The present invention is the first invention that requires no human involvement in the full creation, configuration and improvement processes of an autonomous Conversational AI (ACAI) system that can service users and their conversational requests in natural language for an entity. One key idea in the invention is that most entities have logs or records of past conversations that have already occurred between users and human agents, and an AI based system that uses a discovery based approach to inspect these logs and bootstrap itself into an ACAI system by learning to mimic what real human agents have communicated and done in the past when interacting with users.

Also enabled, without involving a human in the entity to manually configure anything, is the ACAI system's ability to get better and better in coverage of user request types, accuracy of its language understanding, and its generated actions and responses over time. In one embodiment, each time the ACAI system makes a mistake, and the user says "connect me to a human agent", or "you are not understanding", the ACAI system realizes it made a mistake and over time will try other ways of mimicking what human agents have done in the past, by re-learning from conversation logs. And when it does not make a mistake, the conversation patterns that are working with the user are reinforced in the ACAI system.

BRIEF DESCRIPTION OF THE DRAWINGS

FIG. 5 shows a sample PII-removed conversation between a User and a Human Agent found in the conversation logs.

FIG. 6 shows a sample PII-removed, annotated conversation between a User and the Agent where the User begins the conversation by wanting to cancel their subscription and rejects the Agent's counter-offer, prompting the Agent to cancel their subscription. The figure shows the turn-level auto-intent, turn-level auto-response and Sentence-level auto-intent predicted at each turn of the conversation. N/A indicates that no annotation is necessary in that turn.

FIG. 7 shows a sample PII-removed conversation between a User and the Agent indicating the actor, turn and annotations made by the Generative DNN models (205-a), (206-a), and (208-a) at each turn.

FIG. 8 shows a sample PII-removed conversation between a User and the Agent indicating the actor's turn and the ACAI System (103) predictions at each turn.

SUMMARY

In one embodiment, our invention pertains to the observation that using conversational logs, it is possible to bootstrap an entire ACAI system (103) using a discovery process without any configuration involvement from a human in the entity which has these conversational logs. This ACAI system is capable of interacting with humans by mimicking the conversations observed in the conversation logs (201), without any humans configuring it on how to do so. The ACAI system also automatically improves over time by incorporating information acquired while it is being used.

Conversation logs include, but are not limited to, the transcript of the conversation, voice recordings, and meta data pertaining to the conversation with information such as the timestamp when each message was sent, the details of the sender and receiver of the message, the channel through which the message was sent. In one embodiment of the present system, conversation logs are retrieved from a well-known location. This data includes but is not limited to multimodal conversational logs like chat logs, emails, voice recordings of conversations across multiple languages and omni-channel streams.

The invention, in one embodiment, preserves the data privacy requirements of the entity, if the entity wishes to not expose personally identifiable information (PII). This data is absorbed by the PII Anonymizer (202). In this embodiment, it is an existing service which automatically replaces the user's Personally Identifiable Information (PII) with dummy values. See FIG. 5 for sample conversations which identify each of these types of annotations.

Once the conversation logs are uploaded, the log preprocessing module normalizes them into the invention's normalized canonical representation.

The normalized conversation logs go through a series of annotation steps to enrich the conversation logs with NLU annotations including but not limited to turn-level auto-intent, turn-level auto-response, auto-topic, auto-subtopic and sentence-level auto-intent.

Figure 4:
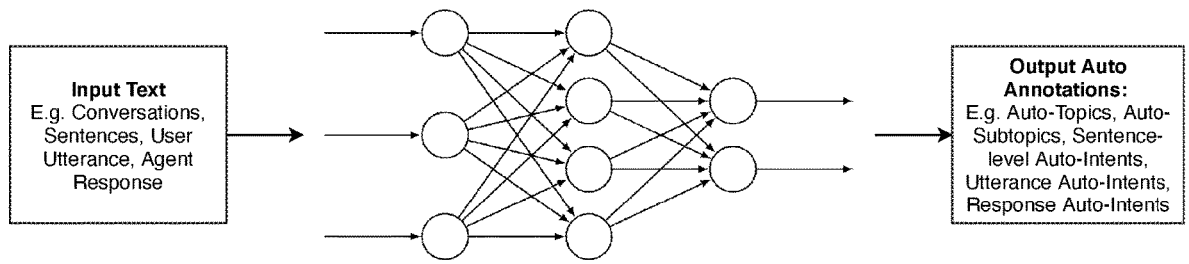
FIG. 4 represents the Deep Neural Network based Generative Models (Generative DNN Models 205-a, 206-a, 208-a) which generates Auto-Annotations for a given Input Text

The NLU annotations are executed by a Generative DNN model (FIG. 4). The Generative DNN model is a language model described in the NLP literature in many applications. Some applications where a language model is used to generate text include summarization of text, story telling, programming code generation, etc.

In one embodiment of the present invention, the Annotation module for Turn-level Auto-Intent and Auto-Response uses a Generative DNN model to annotate the user utterances with a turn-level auto-intent. This turn-level auto-intent represents the main purpose of the user's utterance.

FIG. 6 lists a sample PII-removed, annotated conversation between a User and the Agent where the User begins the conversation by wanting to cancel their subscription to an entity's services and rejects the Agent's counter-offer for lowering the price of the subscription, prompting the Agent to finally cancel their subscription. The figure shows the turn-level auto-intent, turn-level auto-response and sentence-level auto-intent annotations predicted by the Generative DNN model at each turn of the conversation. N/A indicates that no annotation is necessary in that turn. The topic of this conversation is "User wanting to cancel their subscription" and the subtopic of the conversation is "Agent cancels the subscription".

In FIG. 6, the user shows the turn-level auto-intent of "cancel subscription" while saying "I want to cancel my plan". Similarly, in turn 3 sentence 1, the user says "I just dont need it anymore" where the turn-level auto-intent is "cancel reason" because the user is explaining the reason why they don't need the subscription. It is important to note that the Generative DNN model is capable of annotating this user utterance with the intent "cancel reason" even though it has never seen the "cancel reason" intent or the user utterance, or even "I just dont need it anymore" in the training data when the Generative Model was trained.

The Annotation module for Conversation Level Auto-Topics and Auto-Subtopics (206) (FIG. 2) uses a Generative DNN model (206-a) to annotate each conversation with an auto-topic and auto-subtopic. The topic is the general theme of the conversation, and the subtopic is the primary task that was accomplished or the primary outcome of the conversation. For example, in FIG. 6, the conversation is of the topic User wanting to cancel their subscription and within that particular topic, since the user's account was canceled by the human agent, it is of subtopic Agent cancels the subscription. As opposed to the primary topic being User wanting to cancel their subscription and the subtopic being User accepts a lower price offer"

The Generative DNN model (206-a) is trained on a dataset from entities with conversations already having similar topic and subtopic annotations. The Generative DNN model (206-a) produces auto-topics and auto-subtopics for each conversation seen in the conversation logs.

The conversation logs obtained after annotation from the Generative DNN model (206-a) are used by the Conversation Ranker module (207) to discover conversation flows that maximize coverage of the auto-topics and auto-subtopics seen in the conversation logs. In this context, coverage refers to the measure of the proportion of unique User-Agent conversation flows identified by the system to the unique User-Agent conversation flows found in the conversation logs. A conversation flow represents a User-Agent conversation that leads to the same outcome. For example, we regard all the conversations where the User requested a cancellation and rejected the Agent's counter-offers as one unique conversation flow. There can be duplicate flows discovered from the logs, which do not add much value since we identify unique flows.

Furthermore, the Generative DNN (206-a) discovers most auto-topics and auto-subtopics from the logs and it is good enough to be deployed, however, it is possible that some topics and subtopics are missed and will result in the user requiring a hand-off to a human agent. This can be addressed in the automatic retraining stage. As new flows are discovered with new historical conversation logs, the Generative DNN (206-a) discovers more auto-topics and auto-subtopics thereby increasing the coverage with time and eventually leading to convergence.

In one embodiment of the present invention, since Users are unrestricted in what they can say to an agent, the present invention focuses on identifying the most frequent conversations found in the conversational logs, between the User and the Agent. To maximize coverage of topics and subtopics the ACAI system will handle, while using a small number of initial conversations, a. Conversation Ranker module identifies the top k most frequent auto-topic and auto-subtopic pairs, and selects the n most representative conversations for each auto-topic and auto-subtopic pair. It does so by calculating a normalized mean conversation embedding of all the conversations in each auto-topic and auto-subtopic pair, and choosing the n conversations closest to the normalized mean conversation embedding. A conversation embedding is a vector representation of the conversation in a multi-dimensional space with the property that similar conversations will have conversation embeddings that are closer to each other in the multi-dimensional space and conversely, dissimilar conversations will have conversation embeddings that are farther apart in the multi-dimensional space.

An Annotation module for Sentence-Level Auto-Intents (208) is also utilized in one embodiment of this invention. This module uses another Generative DNN model to annotate the segmented user utterances from the selected conversations with a sentence-level auto-intent. A sentence-level auto-intent is identified for each sentence in the user utterance. For example, in FIG. 6, the user replies with two sentences in turn 3 "Yes." and "I just dont need it anymore". The user says "Yes" in the first sentence and is thus annotated with an affirm sentence-level auto-intent. The second sentence is annotated with a cancel reason sentence-level auto-intent because the user explains why they don't need the subscription by saying "I just dont need it anymore". This process is identical to the first Generative DNN model with the difference being that the third Generative DNN model is trained on a dataset consisting of sentence-level auto-intents.

Once all the conversations are annotated, in one embodiment of the present invention, the AutoFlows Generator (209) generates the conversation flows per auto-topic and auto-subtopic in a graph where the root node denotes the start of all conversation flows having the same auto-topic and auto-subtopic. A conversation flow is a sequence of sentence-level auto-intents and turn-level auto-responses.

In one embodiment of the present invention, the conversation flows having nodes with frequency higher than a certain frequency threshold are included as stories in the Automatic Conversational AI Configuration. A story is defined as any linear subset of the graph and represents a specific manifestation of a unique conversation flow. For example, the conversation in FIG. 6 has the story: {cancel subscription, welcome message, ask cancel reason, affirm, cancel reason, offer plan, cancel subscription, cancellation confirmation, closing question).

One of the last steps in the present invention before the ACAI system trains itself for deployment for live use, is configuring itself for fulfillment actions which are usually served via APIs connected to an entity's software infrastructure, and contextual slots and responses. A slot is a set of values extracted from a user utterance, or returned from a fulfillment action.

Consider a sample PII-removed conversation between a User and the Agent indicating the actor, turn and annotations at each turn in FIG. 7. Model describes which model is responsible for prediction. Annotation Type indicates the type of annotation used for training the model and Annotation indicates the actual value. The User begins the conversation by wanting to cancel their subscription and rejects the Agent's counter-offer, prompting the Agent to actually cancel their subscription.

In the course of a conversation, an ACAI system needs to perform certain fulfillment actions. For example, loading a given user's account information from a database, or making an API call to get current weather information. In one embodiment of the present invention, we automate the task of identifying system actions, along with action implementations, without configuration help from a human in the entity. The objective is to identify where in a conversation actions need to be performed, which actions need to be performed and with what attributes. The Action Annotation module (210) uses both user messages and agent responses. A natural-language-to-SQL model is used to convert user messages such as "How much is due?" in an SQL query or an API call based on available schema information. Similarly, agent responses such as "Let me load your account information" are also translated into SQL or API action.

Turn 3 in FIG. 7 shows that the fulfillment action sql_load_account_information returns the name of the user. This is the slot that is used to build the response template "Hi $name, may I know the reason?".

The present invention uses the construct of conversation context variables in addition to slots. The conversation context variables are used to keep track of the conversation state and previously mentioned slots.

In one embodiment of the present invention, the conversation context variables are discovered using a DNN that is trained on an existing dataset with <conversation state, conversation context variable> for every turn in the conversation and thus learns to predict the context variable at every turn.

In one embodiment of the present invention, the ACAI system configuration has now been created using the Configuration Generator (211) and it contains stories annotated with intents, responses, fulfillment actions and slots. The ACAI system then self-trains itself using this configuration and yields an NLU model, a DM model, an NLG model and a configured Action Server.

In one embodiment of the present invention, the ACAI system configuration can be exported to a different non-autonomous Conversational AI system built by a third party. Such a Conversational A system could include but is not limited to Google DialogFlow CX or Twilio Auto-pilot, and such third party Conversational AI systems may have their own NLU model, DM model, NLG model and Action Server. Thus, the invention can either bootstrap its own native ACAI system or bootstrap a third party non-autonomous Conversational AI system, which was never intended to be autonomous, but this invention makes the third party system autonomously bootstrapped without configuration by a human. This bootstrapped third party Conversational AI system can then be trained and deployed for live operations.

In one embodiment of the invention, the deployed ACAI system is integrated with the Conversational AI Portal so that if ever an agent in the entity is needed to take over the conversation from the ACAI system, this Portal is where the hand-off occurs. Once an agent is involved, the ACAI system is no longer in the loop and the conversation is no longer being handled by the ACAI system.

The ACAI system is now ready to interact with the users and mimic the stories that it has learned from the conversation logs. In one embodiment of the present invention, the ACAI system can have either a successful conversation, or an unsuccessful conversation with the user. In a successful conversation, the ACAI system correctly acts and responds to the user throughout the conversation. In an unsuccessful conversation, the ACAI system interacts with the user until the user requests an agent handoff, or expresses frustration with the ACAI system. A user can request to speak to a human agent by saying "Transfer me to a human" or other linguistic variations with the same intent. Apart from the user's agent handoff request, other signals based on the user's sentiment, the user's feedback, and the number of times an intent has repeated occurrences are used to calculate a user's dissatisfaction threshold. Once the user requests an agent hand-off or the user dissatisfaction threshold is crossed, they are redirected to a human agent who takes over the conversation in the Conversational AI Portal. At this point the ACM system is no longer in use because a human is involved.

The ACAI system will naturally make mistakes when it is first deployed for live operations in an entity. However, it is capable of learning from its mistakes and getting better and better over time until it makes very few mistakes, and it approximates the capability of a human agent. This is because of the new historical logs being created between a user and a human agent when a hand-off is done, and the conversation exits the ACAI system. A hand-off is requested because of two major reasons: (1) the ACAI system was not trained on a conversation flow pertaining to the user's request or (2) the ACAI system did not understand the user's request. Either way, the unsuccessful conversations now have become part of the conversational logs in the entity. The conversational log discovery process of the ACAI system can be repeated so that the ACAI system learns the new flow and/or understands the user request better by learning more paraphrases and intents for that request. To improve over time, the ACAI system periodically repeats the discovery process using the conversations between the user where the user requested an agent handoff and the agent has handled the user request, because these very conversations have now become historical user agent conversations. This periodic and autonomous discovery process adds new story configurations, retrains the ACAI system and thus enables the ACAI system to continually learn and improve itself without a human involved in configuration of the ACAI system.

DETAILED DESCRIPTION

Embodiments of the present invention provide a computer-implemented system that bootstraps an entire ACAI System (103) from scratch just from data (conversational logs) and AI models unlike any other existing approach where humans manually annotate, configure or design conversational flows.

Figure 1:
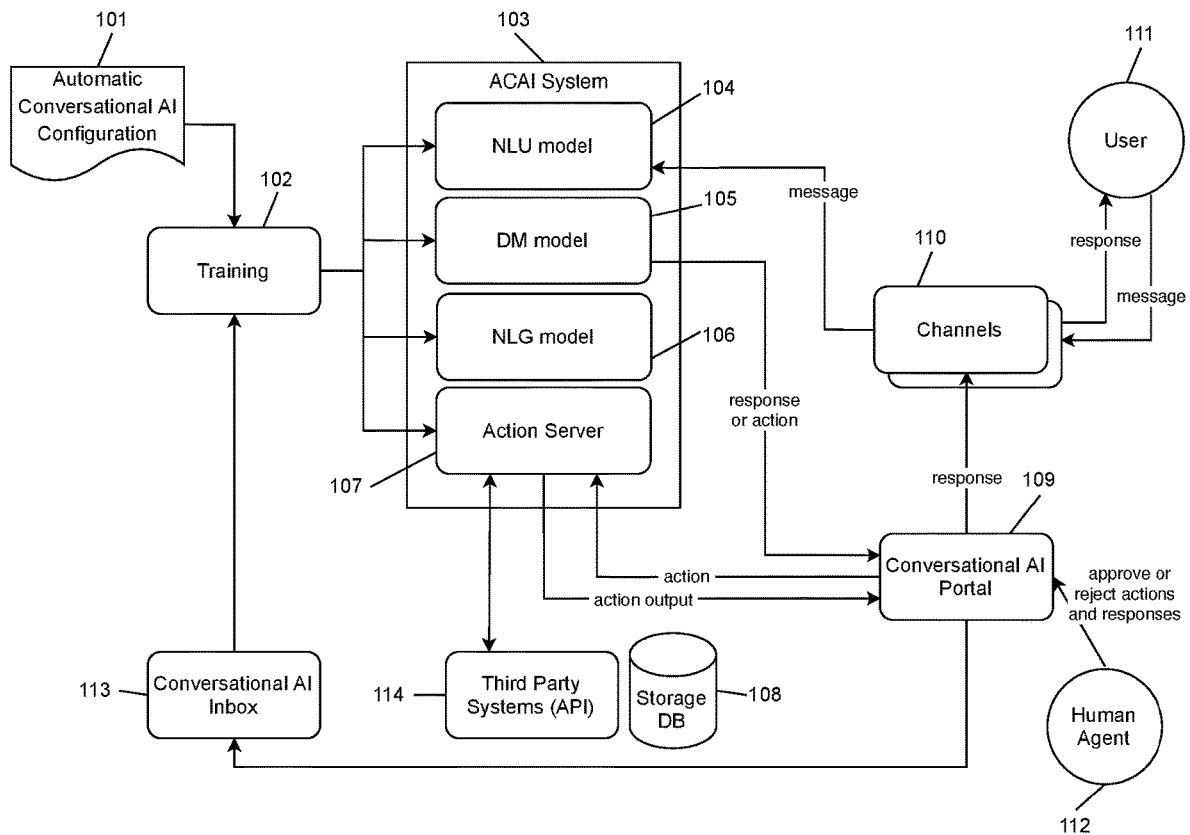
FIG. 1 is an overview block diagram of the major components and personas of the Conversational AI system and method for supporting user (111) conversations with an entity using an ACAI System (103) instead of a human agent (112), in which the ACAI System (103) is created entirely by using the Automatic Conversational AI Configuration (101).

Referring to FIG. 1 those elements depicted within circles represent various personas of the system that access the system via various client interfaces or devices including but not limited to voice recognition apps or devices, web browsers and mobile apps. All other elements depicted in the figure are the computer-implemented components of the system according to one embodiment of the present invention.

Figure 2:
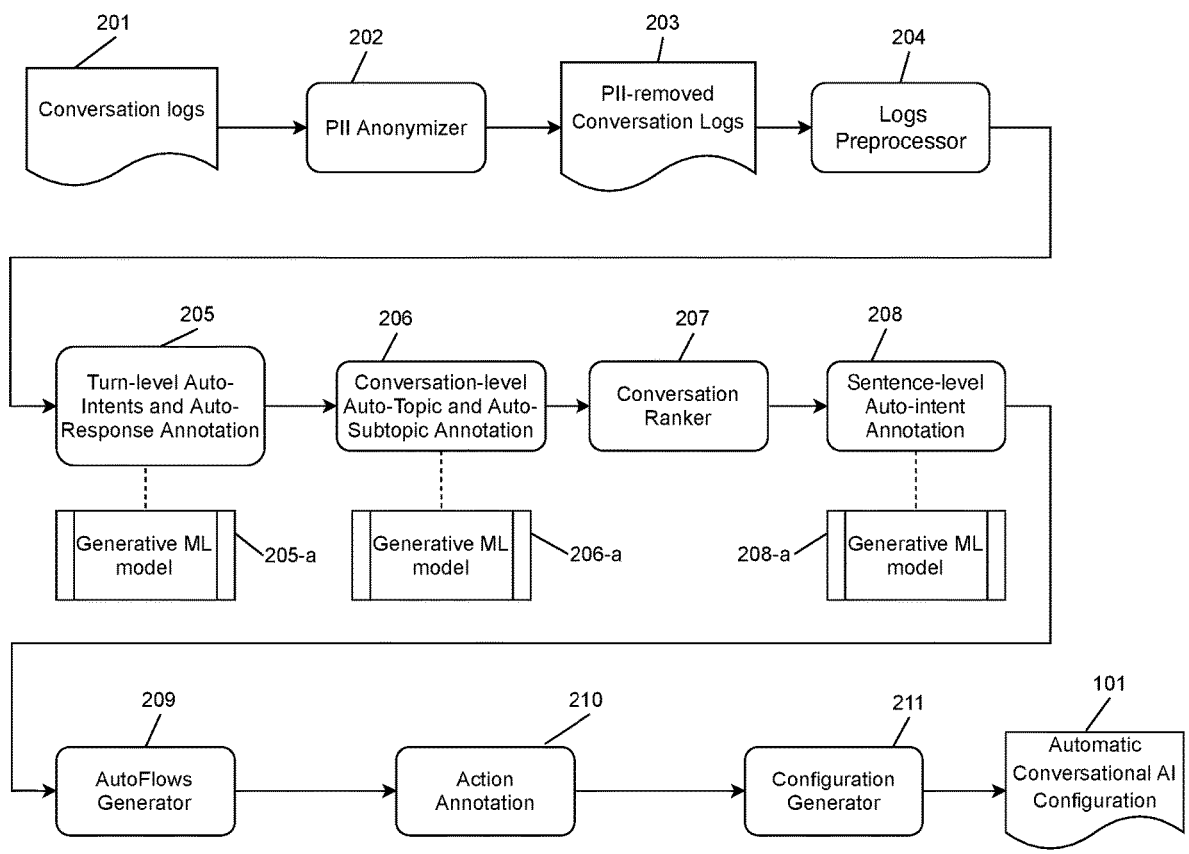
FIG. 2 is an overview block diagram of the major components of the proposed system and method in which the Automatic Conversational AI Configuration is created automatically by inspecting past conversations between users (111) and human agents (112) (shown in FIG. 1) that is generating Automatic Automatic Conversational AI Configuration (101) as output which is used in training the ACAI System (103).
Figure 3:
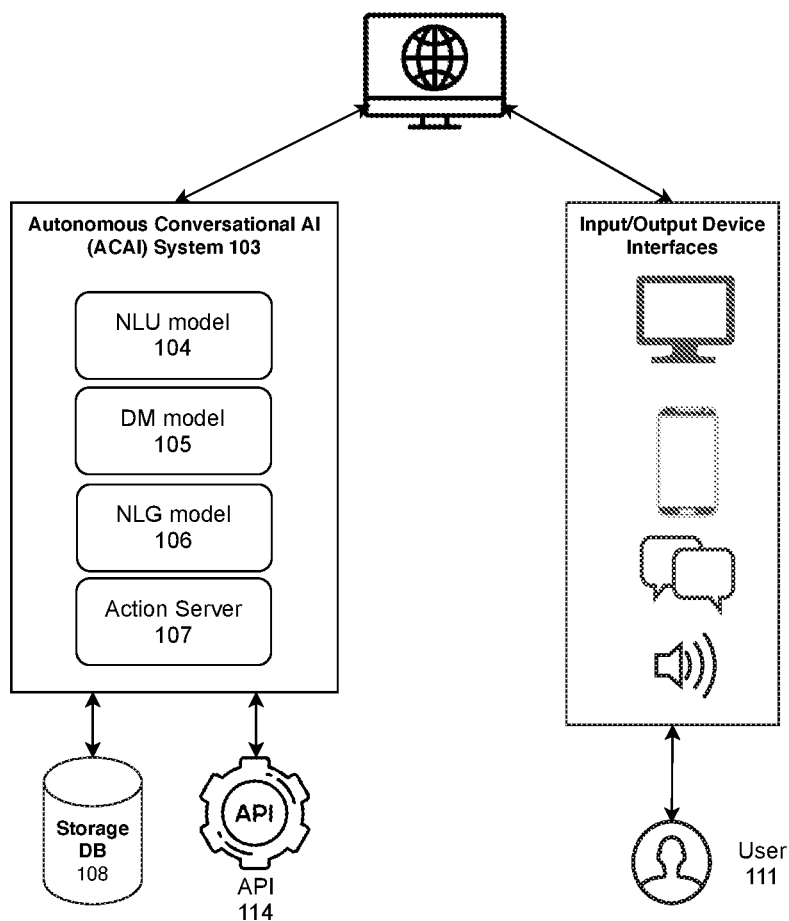
FIG. 3 is the representation of the ACAI System (103) being used by a User (111) over the internet.

Referring to FIG. 2 all elements depicted in the figure are the computer-implemented components of the system according to one embodiment of the present invention.

There are three main personas that are traditionally involved in the creation and functioning of an ACAI System (103). In the present invention, none of the human personas are involved in the creation of an ACAI System (103). User (111) and human agents (112) are only involved during inference time, after the ACAI System (103) has already been created and deployed. Users (111) are involved since the primary function of the ACAI System (103) is to interact with them. Human agents (112) are involved to continue conversation where the User (111) requests to speak to a human or is handed off based-on a computed signal. These three personas are:

1. Users (111): They are the end users who interact with the ACAI System (103) to address their issues, requests or any other reason.
2. Agents: They are responsible for conversing with the users (111) to address their queries and fulfill their requests. There are two types of agents, namely the ACAI System (103) and the human agent (112).

In one embodiment of the present invention, the Conversation logs (201) are retrieved directly from a well-known location and passed through the PII Anonymizer (202).

In one embodiment of the present invention, the PII Anonymizer (202) identifies information like name, phone number, email address, address, bank account numbers, credit card information etc, and can either replace the existing information with fake values or with placeholder tokens to indicate that a value has been replaced.

In one embodiment of the present invention, once the PII-removed Conversation Logs (203) are generated, they are automatically validated, scrubbed and normalized according to the invention's data format by the Logs Preprocessor (204). In this step, the logs are enriched with a Universally Unique Identifier (UUID) to uniquely identify each message, turn numbers to record the sequence in which the messages were sent and the actor information, whether it was sent by the user (111) or the human agent (112). A turn number is the sequence number in which each reply in the conversation is sent irrespective of the sender of the reply. The first message in the conversation is viewed as the 0th turn, the second message is viewed as the 1st turn, and so on.

In one embodiment of the present invention, Logs Preprocessor (204) normalizes them into the invention's canonical representation. In one embodiment of the present invention, the system handles different modes of conversational logs including but not limited to chat logs, email logs, and voice differently. In chat logs, users tend to send multiple shorter texts and expect real time responses from the human agent. However, in emails, users tend to show much more variability in the length of the message. Since the response to an email is not immediate, the users tend to include more content into a single email. While chat logs and voice recordings are similar in nature, voice recordings are also prone to Automatic Speech Recognition (ASR) hypothesis errors like repetitions and filler words. The ASR hypothesis converts a voice recording into a text format identical to the text found in chat logs. An example of filler words are the user saying "ummm i want to cancel". Here "umm" is a filler word typically found in voice recordings. An example of repetition is "okay okay let's cancel". Here "okay" is repeated twice.

Since emails contain a lot of irrelevant information including but not limited to greetings and salutations, in one embodiment of the present invention, the present invention uses a DNN to extract the body of the email. This DNN is trained on a large corpora where the dataset contains tuples of the format <raw email, body span>. The body spans are indexes in the raw email which contain the body of the email. After training, the DNN is able to extract the body from the emails. Similarly, the DNN is trained with the same dataset format for voice recordings, where it learns to remove filler words and repetitions from the ASR hypothesis using multiple spans. After invoking the DNN on emails and voice recordings, we obtain the extracted email body and ASR hypothesis which is referred to as the user utterance since it is identical to the user utterance found in chat logs.

In one embodiment of the present invention, the Logs Preprocessor module (204) uses a model or tool like Stanza (https://stanfordnlp.github.io/stanza/tokenize.html#tokenization-and-sentence-segmentation) or NLTK' sentence tokenizer (https://www.nltk.org/_modules/nltk/tokenize/punkt.html#PunktSentenceTokenizer) to segment the user utterance into multiple sentences. For example, the user utterance "Hello there. I want to cancel my subscription. I don't really need it anymore." is segmented into three sentences "Hello there.", "I want to cancel my subscription." and "I don't really need it anymore.". Segmentation normalizes the conversation logs across multiple streams such that the conversation logs from all the modes are now framed as an identical problem in the invention's canonical representation.

In the process of discovery, a key step is to discover user intent and system response at each turn. To do this, in one embodiment, we use a Generative DNN model (205-a) fine-tuned on an existing dataset (not provided by a human in the entity) which contains data from a similar domain. Fine-tuning the model is a separate process and occurs before the discovery process begins. Unlike Discriminative DNN models that classify text into intents from a pre-decided, fixed sample space, the Generative DNN model (205-a) learns the distribution of intents in a particular domain, and generates intent labels for the utterances. Thus can be generalized across conversation logs (201) from a similar domain.

The invention leverages a particular domain's pre-built datasets to finetune the Generative DNN models (205-a), (206-a), and (208-a) before the discovery process. For example, entities in the Software-as-a-Service (SaaS) business domain typically have customers who pay on a monthly subscription basis. When this entity services its customers (user (111), their human agents frequently encounter intents like cancel subscription, refund request, update subscription, etc when interacting with the user (111). Furthermore, User (111) will typically use linguistic phrases like "I want to cancel", "Please cancel my account", "I don't want my subscription anymore", to indicate an intent to cancel subscription. In this case, it will be fine-tuned on a dataset like {<"I want to cancel", "cancel subscription">, <"Please cancel my account", "cancel subscription">, <"I don't want my subscription anymore", "cancel subscription">, . . . }. These datasets are created by human experts that are skilled in the art for a variety of domains for all the annotation tasks described in the invention.

Since the fine-tuned Generative DNN models (205-*a*), (206-*a*), and (208-*a*) have already learnt to mimic the annotations made by human experts in the business domain of the entity, they accurately annotate the Conversation logs (201) as well.

In FIG. 6, we see that the Generative DNN model (206-*a*) annotated the message in each turn of the conversation with a turn-level auto-intent and a turn-level auto-response (205). For example, turn 0 and sentence 0 shows a user message with the cancel subscription turn-level auto-intent.

In one embodiment of the present invention, each conversation is annotated with an auto-topic and an auto-subtopic. The turn-level auto-intent and auto-response annotations obtained from the previous step are used as the input to annotate the conversation-level auto-topics and auto-subtopics (206).

Similar to the previous annotation step, in one embodiment of the present invention, a Generative DNN model (206-*a*) fine-tuned on an existing dataset. The dataset contains data from a similar domain, is used to annotate auto-topic and auto-subtopic for each conversation, and is not provided by a human in the entity.

In one embodiment of the present invention, the Conversation Ranker (207) selects the n most representative conversations in each auto-topic and auto-subtopic pair for the top-k most frequent auto-topic and auto-subtopic pairs for maximum coverage. In this context, coverage refers to the measure of the proportion of unique user-human agent conversations identified by the system to the unique user-human agent conversations found in the conversation logs (201).

For example, FIG. 8 lists a sample conversation between a User and the Agent where the User begins the conversation by thinking about canceling their subscription but ends up accepting the Agent's counter-offer. The topic of this conversation is "User wanting to cancel their subscription" and the auto-subtopic of the conversation is "User accepts the offer". The Conversation Ranker (207) finds the most representative conversations within the same auto-topic and auto-subtopic.

To maximize coverage while using a small number of initial conversations, the Conversation Ranker (207) identifies the top k most frequent auto-topic and auto-subtopic pairs and selects the n most representative conversations for each auto-topic and auto-subtopic pair. It does so by calculating a normalized mean conversation embedding of all the conversations in each auto-topic and auto-subtopic pair, and choosing the n conversations closest to the normalized mean conversation embedding. A conversation embedding is a vector that represents the conversation in a multi-dimensional space. This technique is used in many NLP applications like sentiment analysis, machine translation, document summarization to represent words, sentences and any other text into a multi-dimensional space.

In one embodiment of the present invention, Sentence-level Auto-Intent annotation (208) enables the ACAI System (103) to respond to longer messages, typically found in emails. Since each sentence in these longer messages can have a different intent, we introduce the construct of a sentence-level auto-intent. In the Sentence-level Auto-Intent annotation (208), each of the split sentences from user utterance are annotated with sentence-level auto-intent using the Generative DNN model (208-*a*). Note that the human agent's (112) responses are not segmented into a list of constituent sentences.

In FIG. 6, the user (111) replies with two sentences in turn 3. The user (111) says "Yes" in the first sentence and is thus annotated with an affirm sentence-level auto-intent. The second sentence is annotated with a cancel reason sentence-level auto-intent because the user (111) explains why they don't need the subscription by saying "I just dont need it anymore".

Similar to the turn-level auto-intent and auto-response annotation (205), in one embodiment of the present invention, a Generative DNN model (208-*a*) fine-tuned on an existing dataset (Not provided by a human in the entity) which contains data from a similar domain, is used to annotate the sentence-level auto-intent for each conversation.

In one embodiment of the present invention, the Auto-Flows Generator (209) converts the conversations into a graph of sentence-level auto-intents and turn-level auto-responses. In this graph, a flow is defined as any subset of the graph. Similarly, a story is defined as any linear subset of the graph and represents a specific manifestation of a unique conversation flow. For example, the conversation in FIG. 6 has the story: {cancel subscription, welcome message, ask cancel reason, affirm, cancel reason, offer plan, cancel subscription, cancellation confirmation, closing question}. There is a key difference between stories and flows. While stories and flows both represent conversations, a story cannot have branching conditions because it is always linear whereas flows can have branching conditions according to business logic or other conditions.

After all the conversations have been converted into flows, the present invention uses a multi-sequence subsequence alignment algorithm to simplify the flows. Multi-sequence subsequence alignment is a set of techniques used in bioinformatics to detect alignment in genetic code and for other related use cases. In one embodiment of the present invention, we use this technique to align matching parts across the conversation flows. The flows in each auto-topic and auto-subtopic pair having user intents and system responses above a certain frequency threshold are selected. The higher the frequency threshold, the simpler the flows.

If the topic User wanting to cancel their subscription and subtopic Agent cancels the subscription are selected, then all the conversations will become a part of Conversational AI System's (103) initial configuration thus, equipping the ACAI System (103) to converse with users (111) in situations where they express a desire to cancel their subscriptions. Note that while using more conversations might result in higher coverage, it also significantly increases the complexity of the flows used to configure the ACAI System (103) and thus, makes the ACAI System (103) susceptible to mimic complex flows rather than simple ones.

During the course of a conversation, an ACAI System (103) needs to perform certain actions. For example, loading a given user's account information from a database, or making an API call to get current weather information. In one embodiment of the present invention, we automate the task of identifying system actions, along with action implementations. The objective is to identify where in a conversation actions need to be performed, which actions need to be performed and with what attributes. The Action Annotation module (210) uses both user messages and agent responses. A "Natural Language to SQL" model is used to convert user messages such as "How much is my account due?" in an SQL query or an API call based on available schema information. Similarly, agent responses such as "Let me load your account information" are also translated into SQL or API action. Using a pre-trained slot-extractor model and tagging the words into slots, some of which can be the output of API or database action (requestable slots) while other words can be the placeholder for making the response more sensible. E.g. in the utterance "how much of my <amount due>" "amount due" becomes requestable slots while other words are placeholders for grammar purposes. The present embodiment uses a state of the art "Natural Language to SQL" system called BERTrand-DR to generate SQL for database actions to obtain actionable requestable slots or select an API from the provided list of APIs.

After these steps, the Automatic Conversational. AI Configuration (101) is created which contains stories annotated with intents, responses, fulfillment actions and slots. In one embodiment of the present invention, the stories annotated by the Action Annotation (210) are part of the initial Automatic Conversational AI Configuration (101). All the annotations from the previous steps associated with the selected stories are stored in the Automatic Conversational AI Configuration (101). Every discovered intent and response is pre-populated with paraphrases derived from the conversations after the Sentence-level Auto-intent annotation step (208). All the user utterances having the same sentence-level auto-intent are paraphrases of each other. Automatic Conversational AI Configuration (101) can be exported to existing non-autonomous Conversational AI system frameworks including but not limited to RASA [Reference 1, Reference 2], DialogFlow CX [Reference 2], Microsoft Luis [Reference 2].

In one embodiment of the present invention, after the Automatic Conversational AI Configuration (101) is created, the training of the ACAI System (103) is triggered.

Still referring to FIG. 1, the ACAI System (103) uses the Automatic Conversational AI Configuration (101) containing stories annotated with intents, responses, fulfillment actions and entities to train and deploy the Natural Language Understanding (NLU) model (104), Dialog Management (DM) model (105), Natural Language Generation (NLG) model (106) and Action Server (107). The NLU model (104) is responsible for understanding the user's utterance. The DM model (105) is responsible for predicting the unique response template and/or actions to every user message. The NLG model (106) is responsible for generating the final response sent to the user (111). The Action Server (107) executes the predicted fulfillment actions on Third Party Systems and Databases (108).

The NLU model (104) is a neural network that is trained on a dataset with tuples <user utterance, sentence-level auto-intent. Thus, when the ACAI System (103) receives the incoming messages, it is able to predict the sentence-level auto-intent for every message.

The DM model (105) is a neural network trained on a dataset<{user utterance, NLU predictions, conversation history}, {sequence of responses and/or actions}>. While training, the DM model (105) takes the tuple containing a set of information: user utterance, NLU predictions like intent, entity, etc. and conversation history like the previous n user utterances and system responses. This set has a corresponding label: a sequence of responses and/or actions. Thus, once training is complete, the DM model (105) can predict a sequence of responses and/or actions for a user utterance.

In one embodiment, the NLG model (106) generates the response by filling the slot values in the response template predicted by the DM model (105). In another embodiment, it is a Generative DNN model that generates the response using the user utterance, conversation context variables, result of the NLU model (104) and the result of the DM model (105).

Still referring to FIG. 1, the Conversational AI Portal (109) is a real-time component through which the agent communicates with the user. The agent connects to channel (110) through the Conversational AI Portal (109). In one embodiment of the present invention, the Conversational AI Portal (109) relays the message generated by the ACAI System (103) directly to the channels (110) without any interference by the human agent (112). The Conversational AI Portal (109) passes all the conversations between the agent and the user to the Conversational AI Inbox (113).

Once the ACAI System (103) is trained and deployed on the server, it is ready to interact with the users. In one embodiment of the present invention, the user (111) initiates a conversation with the ACAI System (103) on a particular channel. In one embodiment of the present invention, the channel sends the user utterance to the trained ACAI System (103). For instance, in conversation 1 shown in FIG. 7, the user (111) initially says "Please cancel my account". Since this is the first message in the conversation, it has the turn 0.

In one embodiment of the present invention, the user utterance is first passed through the NLU model (104) to obtain the intent and subsequently to the DM model (105) which predicts either a response or an action. If the prediction is a response template, the NLG model (106) fills the predicted response template with the appropriate slot information.

In one embodiment of the present invention, the fulfillment action predicted by the DM model (105) is executed on the Action Server (107). To illustrate the working of a fulfillment action, we consider the conversation in FIG. 7 which predicts a fulfillment action (sql_load__account_information) in turn 3. This is a SQL-based action and thus, is executed on a database (108) to retrieve the account information. This fulfillment action loads the account information of the user (111) and stores it in the conversation context variables.

In one embodiment of the present invention, the fulfillment action executes on the third party system (108) and returns the value to the Action Server (107).

In one embodiment of the present invention, the Action Server (107) sends the result of the fulfillment action to the Conversational AI Portal (109). The Conversational AI Portal (109) sets the results as entities in the conversation. These entities are used by the DM when it makes the next prediction.

In one embodiment of the present invention, after the response or action predicted by the ACAI System (103), it predicts another response or action until it predicts an action_listen. If the prediction is another fulfillment action, the fulfillment action is executed on the third party systems (108) and the ACAI System (103) makes another response or action prediction. If the prediction is a response, the predicted response template is filled with slot information and the ACAI System (103) makes another response or action prediction. Once the DM predicts an action_listen, the DM stops making any more predictions and the step comes to a halt.

In one embodiment of the present invention, the responses and actions are sent to channel (110) from the Conversational AI Portal (109).

In one embodiment of the present invention, channel (110) sends the responses and actions to the user (111).

In one embodiment of the present invention, after receiving each user's utterance, a check is made to identify if the user's dissatisfaction threshold is crossed. If the threshold is crossed, the conversation is handed off to a human agent (112) immediately and the ACAI System (103) stops making further predictions. The user dissatisfaction threshold is computed by combining two types of signals (1) utterance-level and (2) conversation-level.

Utterance-level signals include whether the user (111) requested to speak to a human agent (112), the sentiment of the user (111) in each utterance. If the user (111) requests for a hand-off, then the conversation is immediately handed off to an available human agent (112) irrespective of any other signal. Additionally, the sentiment (positive, negative or neutral) of a user's utterance is a signal to the user dissatisfaction threshold.

Conversation-level signals include features such as: the sentiment of the entire conversation (positive, negative or neutral), the presence of multiple fallback intents. A fallback intent occurs when the NLU model (104) has low confidence in it's intent prediction. If the NLU model (104) predicts the fallback intent, the NLG model (106) will generate a response that asks the user (111) to rephrase their request. For example, it could say "I did not understand your request. Can you please rephrase it for me?".

If the sentiment of the conversation is negative, it could indicate that the user (111) was not satisfied with the agent's responses. The presence of multiple fall back intents in a conversation suggests that the ACAI System (103) might not be trained to understand the user's (111) request. For example, if the ACAI System (103) was only trained on conversations under the topic User wanting to cancel their subscription, the NLU will predict a fall back intent when a user (111) interacts with the ACAT System (103) to get a new account since it does not have a request new account intent.

In one embodiment of the present invention, the Conversational AI Portal (109) uploads the conversations between the user (111) and the ACAI System (103) to the Conversational AI Inbox (113) in real time.

Over time, the ACAI System (103) needs to be re-trained for three major reasons:
1. To discover new auto-topics, auto-subtopics, auto-intents, fulfillment actions and flows that were absent in the previous Conversation logs (201) and thus, are not configured in the Automatic Conversational AI Configuration (101).
2. To improve the performance of DM model (105), and NLG model (106) by discovering new conversation flows within auto-topic and auto-subtopics that are already configured in the Automatic Conversational AI Configuration (101).
3. To improve the performance of the NLU model (104) by discovering new paraphrases for existing intents and response templates for existing responses.

In one embodiment, the present invention uses every conversation that was handed off to the human agent (112) since the last retraining. These conversations are populated in the Conversational AI Inbox (113). The conversations serve as the conversation logs (201) for the next discovery process.

The reason why these conversations are selected is because they were handed off to a human agent (112) midway during the conversation. This is a strong indication that the ACAI System (103) was unable to understand or service the user's (111) requests. Thus, the handed off conversations are included in the subsequent discovery process. When this process completes and the new ACAI System (103) is deployed, it can successfully respond to the flows, understand the user (111) and service their requests in cases where the previous ACAI System (103) failed. If the conversation is not handed off to a human agent, it means that the ACAI System (103) successfully serviced the user (111). In this case, the ACAI System (103) does not need to learn new flows.

In conversations where an agent hand-off was done, it is not desirable to include the entire conversation along with ACAI System (103) messages for the discovery process. Thus, the conversations are truncated to only include the conversation between a user (111) and a human agent (112). For example, if a conversation is handed off to an agent in turn 5, the Conversation logs (201) for the new discovery process only contains the conversation starting from turn 5 until the end of the conversation.

In one embodiment of the present invention, a retraining process is triggered periodically. The new Conversation logs (201) from the Conversational AI Inbox (113) are passed through the discovery process, leading to a new Automatic Conversational AI Configuration (101). This configuration file adds new stories to the existing configuration and then retrains the ACAI System (103). Now, the improved ACAI System (103) is ready to interact with the users (111).

In one embodiment, the present invention supports multilingual data and channels like chat, email and voice. It bootstraps an ACAI System (103) for any language (100+) by leveraging conversational logs from a single language like English. It does so by using state-of-the-art multilingual DNN that takes a user utterance from any language and generates an embedding which allows the NLU model (104) to understand multiple languages, and translating the response templates configured in the ACAI System (103) to the target language that the user wishes to communicate in.

In one embodiment, the present invention is encapsulated in a user interface that does not require any persona to write code in a programming language, and connects to the channels (110) and backend systems via connectors. Backend systems include but are not limited to Databases, CRM (Customer Relationship Management) softwares, Ticketing systems, other non-autonomous Conversational AI system frameworks and Knowledge Bases. Thus, the system can read from or write to backend systems that the user wants to connect to, allowing the invention to converse with a customer in real-time with access to up-to-date information and the ability to fulfill customer requests including but not limited to canceling a subscription, processing a refund, and redirecting to a concierge service.

The foregoing descriptions, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:
1. A method for automatically generating a configuration for an autonomous conversational artificial intelligence (ACAI) system, the method comprising:
receiving a conversation log comprising interactions between at least two actors;

processing the conversation log to normalize the conversation log into a canonical representation;
generating a first configuration for a Natural Language Understanding model of the ACAI system, by:
utilizing a first generative language model fine-tuned on a domain-specific dataset to annotate user utterances in the conversation log with turn-level auto-intents and auto-responses;
annotating each conversation with conversation-level auto-topics and auto-subtopics using a second generative language model, wherein the second generative language model is fine-tuned on a dataset containing similar topic and subtopic annotations from the same domain; and
selecting representative conversations based on the frequency of auto-topic and auto-subtopic pairs to maximize coverage of interactions between actors;
generating a second configuration for a Dialog Management model of the autonomous conversational system, by:
converting the annotated conversations into a graph of sentence-level auto-intents and turn-level auto-responses using a third generative language model fine-tuned on a dataset with sentence-level intent annotations;
identifying and aligning matching parts across conversation flows using a multi-sequence subsequence alignment algorithm; and
selecting flows with user intents and system responses above a specified frequency threshold to simplify the second configuration; and
automatically configuring the ACAI system using the generated first and second configurations, wherein the ACAI system, once configured, is trained to mimic behaviors based on learned conversation patterns.

2. The method of claim 1, further comprising:
automatically training and deploying the Natural Language Understanding model and the Dialog Management model using the first and second configurations generated from the annotated conversation logs, without manual intervention, wherein the training involves adapting the models to recognize and process the turn-level auto-intents, auto-responses, and conversation-level auto-topics and auto-subtopics identified in the conversation logs.

3. The method of claim 2, further comprising:
enabling the ACAI system to improve its performance over time, by:
periodically incorporating new conversation logs into a learning database of the ACAI system; and
utilizing the new conversation logs to update and refine the first and second configurations, thereby enhancing the ability of the ACAI system to mimic behaviors more accurately by aligning the ACAI system to mimic new behaviors represented in the new conversation logs, without manual intervention.

4. The method of claim 2, further comprising:
processing an input received from a human end-user as part of a conversation, by:
utilizing a Natural Language Generation model to generate an agent response based on context variables and dialogue history provided by the Dialog Management model and intents and entities identified by the Natural Language Understanding model, wherein the Natural Language Generation model performs operations comprising any one or more of:
completing a predefined response template with dynamic information extracted during the conversation, the dynamic information including user-specific data or contextually relevant details;
generating a response from scratch when a predefined template is not applicable, using the Natural Language Generation model to maintain a natural and coherent flow of conversation;
adapting a response based on continuous learning from new conversation logs to improve response accuracy and appropriateness over time; and
supporting multilingual response generation by translating system configurations into multiple languages and fine-tuning based on linguistic data, enabling the system to interact effectively with users in their native languages.

5. The method of claim 2, further comprising:
monitoring the performance of the ACAI system to identify instances of poor performance, including user requests for human intervention or explicit expressions of dissatisfaction;
automatically collecting and storing conversations that led to poor performance, denoting those where the system failed to understand user intents or provided unsatisfactory responses;
analyzing the collected conversations to identify new user intents, conversational flows, or response inadequacies not previously addressed by the ACAI system, and using this analysis to generate an updated configuration for the ACAI system; and
retraining the ACAI system using the updated configuration to incorporate new knowledge and improve its ability to handle similar interactions in the future.

6. The method of claim 5, wherein the monitoring of the ACAI system performance comprises one or more of:
employing mechanisms to capture direct user feedback regarding the performance of the ACAI, including satisfaction ratings and textual feedback provided by users during or after interactions;
implementing automated sentiment analysis tools to assess user sentiment in real-time, identifying negative sentiments as indicators of potential system failures or areas for improvement;
using advanced artificial intelligence techniques, including natural language processing and machine learning models, to extract meaningful patterns and insights from the conversations that indicate common points of failure or user dissatisfaction; and
applying generative models to simulate potential user interactions based on identified gaps, thereby predicting and preparing for future conversational scenarios that the system may encounter.

7. The method of claim 1, further comprising:
translating the first and second configurations generated for the ACAI system into a format suitable for a third-party conversational AI system, utilizing a translation process that adapts the first and second configurations to meet specific input requirements and format standards of the third-party conversational AI system; and
applying the translated configurations to the third-party conversational AI system through use of application programming interface (API) endpoints exposed by the third-party conversational AI system, thereby enabling the third-party conversational AI system to function autonomously and mimic behaviors based on learned conversation patterns, without requiring manual configuration.

8. The method of claim 1, further comprising:
enhancing multilingual capabilities of the ACAI system, by:
translating the generated configurations into multiple languages using a deep neural network model specifically fine-tuned for language translation tasks relevant to conversational AI applications; and
fine-tuning a multilingual language model with the translated configurations to enable the ACAI system to respond in various languages.

9. The method of claim 1, wherein the received conversation log is i) comprised of historical conversations between users and human agents, and ii) derived from at least one of email exchanges, chat-based messages, or voice call logs.

10. The method of claim 1, further comprising:
utilizing a fourth generative language model to identify system actions to be performed during conversations, the system actions comprising at least one of database queries or API calls;
wherein the fourth generative language model is i) trained to convert user messages and agent responses into corresponding system actions, ii) the identified system actions are automatically inserted into the conversations at appropriate locations, and iii) the inserted system actions are incorporated into the second configuration for the Dialog Management model.

11. The method of claim 1, wherein an actor in the at least two actors is one of a human agent and a human end-user, the method further comprising:
processing the conversation log to remove personally identifiable information of each actor in the at least two actors.

12. A system for automatically generating a configuration for an autonomous conversational system, the system comprising:
one or more processors;
one or more memory storage devices storing executable instructions thereon, which, when executed by the one or more processors, cause the system to perform operations comprising:
receiving a conversation log comprising interactions between at least two actors;
processing the conversation log to normalize the conversation log into a canonical representation;
generating a first configuration for a Natural Language Understanding model of the ACAI system, by:
utilizing a first generative language model fine-tuned on a domain-specific dataset to annotate user utterances in the conversation log with turn-level auto-intents and auto-responses;
annotating each conversation with conversation-level auto-topics and auto-subtopics using a second generative language model, wherein the second generative language model is fine-tuned on a dataset containing similar topic and subtopic annotations from the same domain; and
selecting representative conversations based on the frequency of auto-topic and auto-subtopic pairs to maximize coverage of interactions between actors;
generating a second configuration for a Dialog Management model of the autonomous conversational system, by:
converting the annotated conversations into a graph of sentence-level auto-intents and turn-level auto-responses using a third generative language model fine-tuned on a dataset with sentence-level intent annotations;
identifying and aligning matching parts across conversation flows using a multi-sequence subsequence alignment algorithm; and
selecting flows with user intents and system responses above a specified frequency threshold to simplify the second configuration; and
automatically configuring the ACAI system using the generated first and second configurations, wherein the ACAI system, once configured, is trained to mimic behaviors based on learned conversation patterns.

13. The system of claim 12, wherein the operations further comprise:
automatically training and deploying the Natural Language Understanding model and the Dialog Management model using the first and second configurations generated from the annotated conversation logs, without manual intervention, wherein the training involves adapting the models to recognize and process the turn-level auto-intents, auto-responses, and conversation-level auto-topics and auto-subtopics identified in the conversation logs.

14. The system of claim 13, wherein the operations further comprise:
enabling the ACAI system to improve its performance over time, by:
periodically incorporating new conversation logs into a learning database of the ACAI system; and
utilizing the new conversation logs to update and refine the first and second configurations, thereby enhancing the ability of the ACAI system to mimic behaviors more accurately by aligning the ACAI system to mimic new behaviors represented in the new conversation logs, without manual intervention.

15. The system of claim 13, wherein the operations further comprise:
processing an input received from a human end-user as part of a conversation, by:
utilizing a Natural Language Generation model to generate an agent response based on context variables and dialogue history provided by the Dialog Management model and intents and entities identified by the Natural Language Understanding model, wherein the Natural Language Generation model performs operations comprising any one or more of:
completing a predefined response template with dynamic information extracted during the conversation, the dynamic information including user-specific data or contextually relevant details;
generating a response from scratch when a predefined template is not applicable, using the Natural Language Generation model to maintain a natural and coherent flow of conversation;
adapting a response based on continuous learning from new conversation logs to improve response accuracy and appropriateness over time; and
supporting multilingual response generation by translating system configurations into multiple languages and fine-tuning based on linguistic data, enabling the system to interact effectively with users in their native languages.

16. The system of claim 13, wherein the operations further comprise:
- monitoring the performance of the ACAI system to identify instances of poor performance, including user requests for human intervention or explicit expressions of dissatisfaction;
- automatically collecting and storing conversations that led to poor performance, denoting those where the system failed to understand user intents or provided unsatisfactory responses;
- analyzing the collected conversations to identify new user intents, conversational flows, or response inadequacies not previously addressed by the ACAI system, and using this analysis to generate an updated configuration for the ACAI system; and
- retraining the ACAI system using the updated configuration to incorporate new knowledge and improve its ability to handle similar interactions in the future.

17. The system of claim 16, wherein the monitoring of the ACAI system performance comprises one or more of:
- employing mechanisms to capture direct user feedback regarding the performance of the ACAI, including satisfaction ratings and textual feedback provided by users during or after interactions;
- implementing automated sentiment analysis tools to assess user sentiment in real-time, identifying negative sentiments as indicators of potential system failures or areas for improvement;
- using advanced artificial intelligence techniques, including natural language processing and machine learning models, to extract meaningful patterns and insights from the conversations that indicate common points of failure or user dissatisfaction; and
- applying generative models to simulate potential user interactions based on identified gaps, thereby predicting and preparing for future conversational scenarios that the system may encounter.

18. The system of claim 12, wherein the operations further comprise:
- translating the first and second configurations generated for the ACAI system into a format suitable for a third-party conversational AI system, utilizing a translation process that adapts the first and second configurations to meet specific input requirements and format standards of the third-party conversational AI system; and
- applying the translated configurations to the third-party conversational AI system through use of application programming interface (API) endpoints exposed by the third-party conversational AI system, thereby enabling the third-party conversational AI system to function autonomously and mimic behaviors based on learned conversation patterns, without requiring manual configuration.

19. The system of claim 12, wherein the operations further comprise:
- enhancing multilingual capabilities of the ACAI system, by:
- translating the generated configurations into multiple languages using a deep neural network model specifically fine-tuned for language translation tasks relevant to conversational AI applications; and
- fine-tuning a multilingual language model with the translated configurations to enable the ACAI system to respond in various languages.

20. The system of claim 12, wherein the received conversation log is comprised of historical conversations between users and human agents and is derived from at least one of email exchanges, chat-based messages, or voice call logs.

21. The system of claim 12, wherein the operations further comprise:
- utilizing a fourth generative language model to identify system actions to be performed during conversations, the system actions comprising at least one of database queries or API calls;
- wherein the fourth generative language model is i) trained to convert user messages and agent responses into corresponding system actions, ii) the identified system actions are automatically inserted into the conversations at appropriate locations, and iii) the inserted system actions are incorporated into the second configuration for the Dialog Management model.

22. The system of claim 12, wherein an actor in the at least two actors is one of a human agent and a human end-user, the operations further comprising:
- processing the conversation log to remove personally identifiable information of each actor in the at least two actors.

* * * * *